United States Patent
Zhong

(10) Patent No.: US 8,970,814 B2
(45) Date of Patent: Mar. 3, 2015

(54) LIQUID CRYSTAL DISPLAY DEVICE AND MANUFACTURING METHOD THEREOF

(75) Inventor: Xinhui Zhong, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 174 days.

(21) Appl. No.: 13/520,167

(22) PCT Filed: May 18, 2012

(86) PCT No.: PCT/CN2012/075694
§ 371 (c)(1),
(2), (4) Date: Jun. 29, 2012

(87) PCT Pub. No.: WO2013/170476
PCT Pub. Date: Nov. 21, 2013

(65) Prior Publication Data
US 2013/0300964 A1    Nov. 14, 2013

(30) Foreign Application Priority Data

May 14, 2012  (CN) .......................... 2012 1 0147223

(51) Int. Cl.
*G02F 1/1337* (2006.01)

(52) U.S. Cl.
USPC .......................................... 349/123; 349/129

(58) Field of Classification Search
CPC .................................................. G02F 1/133778
USPC .................................................. 349/129, 123
See application file for complete search history.

(56) References Cited

U.S. PATENT DOCUMENTS 5,781,262 A * 7/1998 Suzuki et al. ................. 349/128

FOREIGN PATENT DOCUMENTS

CN              101211068 A       7/2008

* cited by examiner

*Primary Examiner* — James Dudek
(74) *Attorney, Agent, or Firm* — Cheng-Ju Chiang

(57) ABSTRACT

The present invention provides a liquid crystal display device and a manufacturing method thereof. The liquid crystal display device includes a TFT substrate, a CF substrate opposite to and parallel with the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate. The TFT substrate and the CF substrate have inside surfaces that oppose the liquid crystal and are both provided with alignment layers. The alignment layers include flexible alignment films, which are in the form of thin membranes and are positioned on the inside surfaces of the TFT substrate and the CF substrate by being stuck thereto.

5 Claims, 2 Drawing Sheets

LIQUID CRYSTAL DISPLAY DEVICE AND MANUFACTURING METHOD THEREOF

BACKGROUND OF THE INVENTION

1. Field of the Invention

The present invention relates to the field of liquid crystal displaying, and in particular to a liquid crystal display device and a manufacturing method thereof.

2. The Related Arts

A liquid crystal display device generally comprises a TFT (Thin-Film Transistor) substrate, a CF (Color Filter) substrate attached to the TFT substrate, and liquid crystal interposed between the TFT substrate and the CF substrate. Both the TFT substrate and CF substrate are covered with a transparent conductive film (ITO). Afterwards, an alignment film is attached to the two transparent conductive films. The alignment film functions to align liquid crystal molecules.

A general process for forming an alignment film is that an alignment solution is sprayed from a nozzle of a spraying head to the TFT substrate and the CF substrate. The alignment solution is then kept still for a while to allow the solution to spread out to form a film. Finally, baking is carried out to complete the formation of the alignment film. However, it is generally hard to control the amount of the alignment solution sprayed from the nozzle and this usually results in uneven thickness of the alignment film and consequently, the displaying characteristics of the product are affected. In addition, being kept still is necessary in the known process requires for the alignment solution to spread out and this lowers down the manufacture efficiency.

To overcome such a problem, a known technique uses printing or ink-jetting process to coat an alignment film (generally made of polyimide, PI) on the TFT substrate and CF substrate, followed by baking and rubbing operations to complete the alignment process. Further, in MVA (Multi-Domain Vertical Alignment) techniques, bumps of specific shapes or fish-bone like ITO must be formed, or a polymerizable monomer is added in the liquid crystal to allow alignment to be accomplished through ultraviolet polymerization by applying an electrical voltage.

However, these known processes of alignment are subjected to undesired constraints in controlling the size and marginal configuration of an alignment film.

SUMMARY OF THE INVENTION

An object of the present invention is to provide a liquid crystal display device, which uses a flexible membrane like alignment film to serve as the alignment film to simplify the manufacture process, facilitate precise control of size and marginal configuration of the alignment film, and improve product quality.

Another object of the present invention is to provide a method for manufacturing a liquid crystal display device, which accomplishes alignment of liquid crystal molecules through use of a flexible membrane like alignment film to serve as the alignment film so as to simplify the manufacture process, enhance manufacture efficiency, facilitate precise control of size and marginal configuration of the alignment film, and improve product quality To achieve the objects, the present invention provides a liquid crystal display device, which comprises: a TFT substrate, a CF substrate that is arranged opposite to and parallel with the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate. The TFT substrate and the CF substrate have inside surfaces that oppose the liquid crystal and are both provided with alignment layers. The alignment layers comprise flexible alignment films, which are in the form of thin membranes and are positioned on the inside surfaces of the TFT substrate and the CF substrate by being stuck thereto.

The flexible alignment films are formed through stretching, inkjet printing, printing, or polymerization deposition and are attached to the inside surfaces of the TFT substrate and the CF substrate by adhesives.

The flexible alignment films have surface that opposes the liquid crystal and forms alignment structures that are formed through photoreaction or polymerization deposition.

The alignment structures have identical direction of alignment.

The alignment structures are of a fish bone configuration.

The present invention also provides a method for manufacturing a liquid crystal display device, which comprises the following steps:

Step 1: providing a TFT substrate, a CF substrate, and two flexible alignment film units, the flexible alignment film units comprising membrane like flexible alignment films and protection films provided on the flexible alignment films;

Step 2: peeling the protection films off the flexible alignment films;

Step 3: respectively attaching the flexible alignment films to inside surfaces of the TFT substrate and the CF substrate;

Step 4: applying a sealant resin to the inside surface of the TFT substrate to which the flexible alignment film is attached to form an enclosing resin frame;

Step 5: providing liquid crystal and dropping the liquid crystal inside the enclosing resin frame on the inside surface of the TFT substrate; and Step 6: bonding the inside surface of the CF substrate to which the flexible alignment film is attached, in a parallel manner, to the inside surface of the TFT substrate so as to enclose the liquid crystal between the TFT substrate and the CF substrate.

The flexible alignment films are formed through stretching, inkjet printing, printing, or polymerization deposition and are attached to the inside surfaces of the TFT substrate and the CF substrate by adhesives.

The flexible alignment films have surface that opposes the liquid crystal and forms alignment structures that are formed through photoreaction or polymerization deposition.

The alignment structures have identical direction of alignment.

The alignment structures are of a fish bone configuration.

The efficacy of the present invention is that the present invention provides a liquid crystal display device and a manufacturing method thereof, in which a flexible membrane like alignment film is used as an alignment layer to accomplish alignment of liquid crystal molecules thereby simplifying the manufacturing process, reducing the manufacturing cost, and improving manufacturing efficiency and being also helpful for precisely controlling size and marginal configuration of the alignment layer so as to enhance the quality of liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
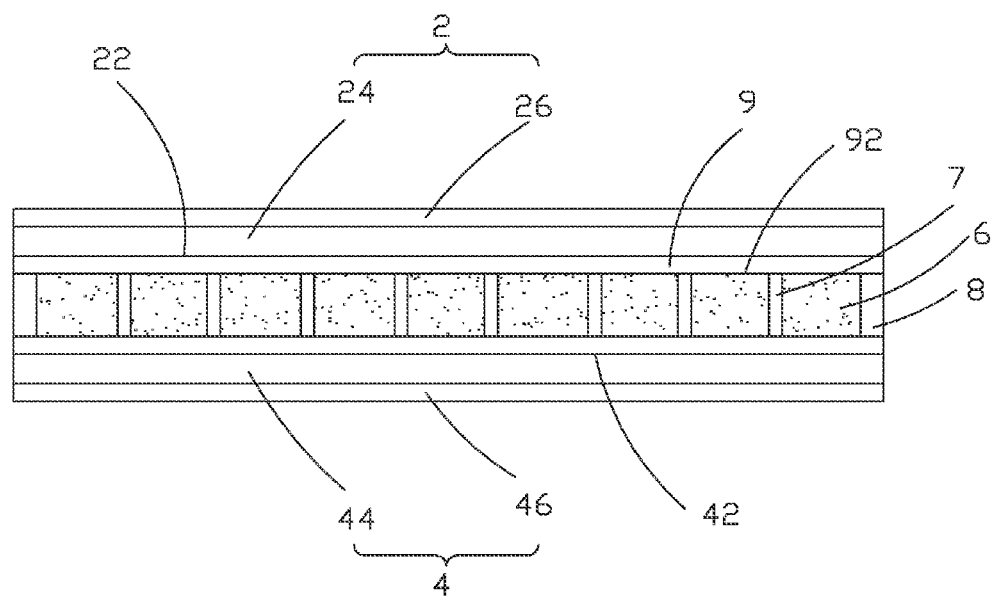
FIG. 1 is a schematic view showing a liquid crystal display device according to the present invention.

Referring to FIG. 1, the present invention provides a liquid crystal display device, which comprises: a TFT substrate 2, a CF substrate 4 that is arranged opposite to and parallel with the TFT substrate 2, liquid crystal 6 interposed between the TFT substrate 2 and the CF substrate 4, spacers 7 arranged between the TFT substrate 2 and the CF substrate 4, and an enclosing resin frame 8 arranged between the TFT substrate 2 and the CF substrate 4 and located along edges of the TFT substrate 2 and the CF substrate 4. The TFT substrate 2 and the CF substrate 4 have inside surfaces that oppose the liquid crystal and are both provided with alignment layers. The alignment layers comprise flexible alignment films 9, which are in the form of thin membranes and are positioned on the inside surfaces of the TFT substrate 2 and the CF substrate 4 by being stuck thereto. The flexible alignment films 9 are formed through stretching, inkjet printing, printing, or polymerization deposition, whereby the manufacture process is simplified. The present invention uses flexible alignment film 9 to form the alignment layers of the TFT substrate 2 and the CF substrate 4 to facilitate precise of the size and marginal configuration of the alignment layers, improve the displaying performance of the liquid crystal display device, and enhance the quality of the liquid crystal display device.

The flexible alignment films 9 are stuck to the inside surfaces 22, 42 of the TFT substrate 2 and the CF substrate 4 that oppose the liquid crystal 6 by adhesives thereby simplifying the manufacture process of the liquid crystal display device and improve manufacture efficiency.

The flexible alignment film 9 has a surface 92 that opposes the liquid crystal 6 and is provided with alignment structures (not shown). The alignment structures are formed through photoreaction or polymerization deposition in order to effect alignment of liquid crystal molecules. The direction of alignment of the alignment structures can be identical or alignment can be effected with specific shape, such as fish bone configuration.

The TFT substrate 2 comprises a first glass substrate 24 and a first polarization plate 26 attached to the first glass substrate 24. The CF substrate 4 comprises a second glass substrate 44 and a second polarization plate 46 attached to the second glass substrate 44. The flexible alignment films 9 are respectively attached to the inside surface 22 of the first glass substrate 24 that is away from the first polarization plate 26 and the inside surface 42 of the second glass substrate 44 that is away from the second polarization plate 46. In other words, the first polarization plate 26 and the second polarization plate 46 are both located on the outer sides of the TFT substrate 2 and the CF substrate 4.

Figure 2:
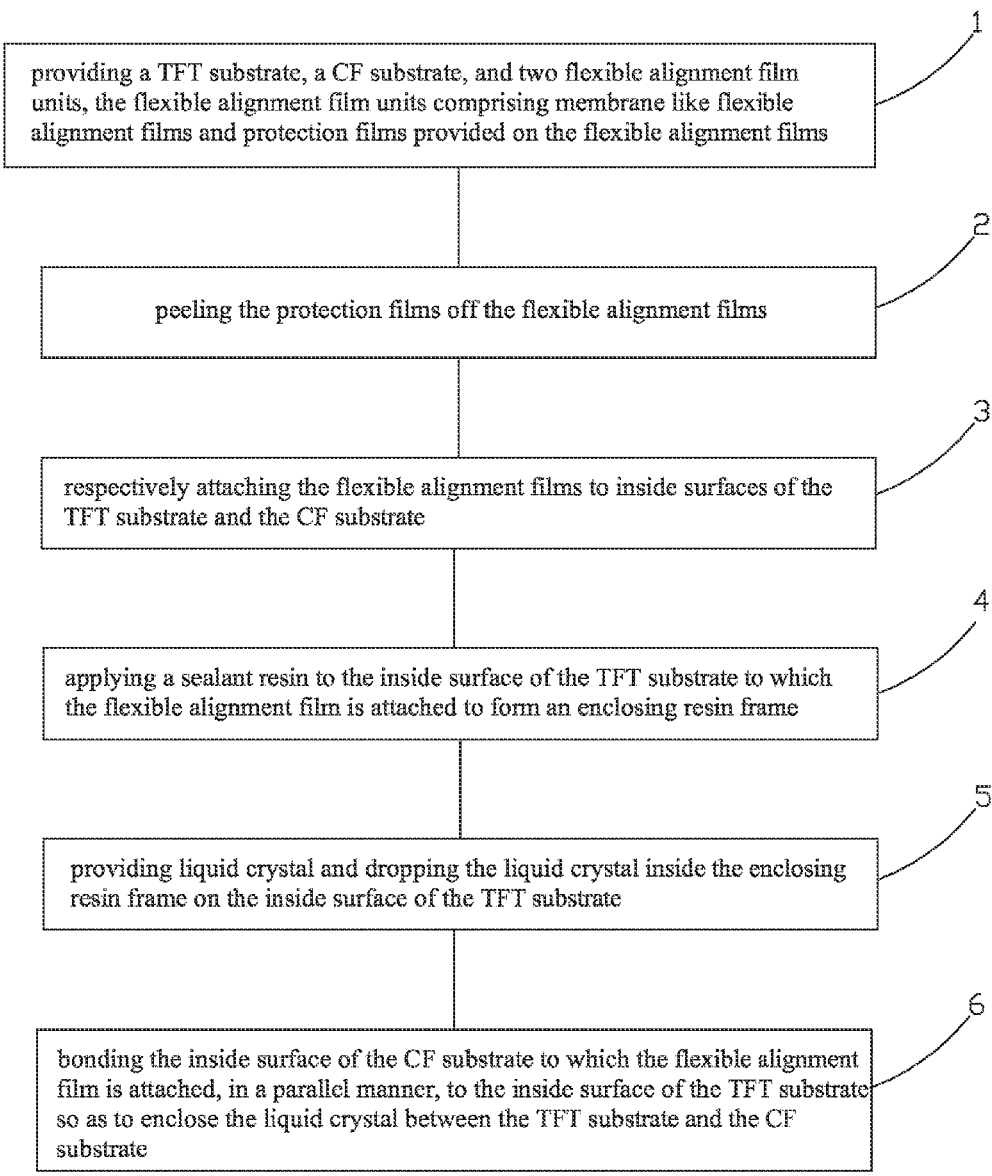
FIG. 2 is a flow chart illustrating a method for manufacturing a liquid crystal display device according to the present invention.

Referring to FIG. 2, the present invention also provides a method for manufacturing the previously described liquid crystal display device, which comprises the following step:

Step 1: providing a TFT substrate, a CF substrate, and two flexible alignment film units, the flexible alignment film units comprising membrane like flexible alignment films and protection films provided on the flexible alignment films, the flexible alignment films being formed through stretching, inkjet printing, printing, and polymerization deposition, the flexible alignment films being provided with protection films thereon for protection the alignment films and ensuring the performance thereof in operation, the protection films being set on the flexible alignment films after the alignment films have been manufactured.

Step 2: peeling the protection films off the flexible alignment films.

Step 3: respectively attaching the flexible alignment films to the inside surfaces of the TFT substrate and the CF substrate by adhesives; the TFT substrate comprises a first glass substrate and a first polarization plat attached to the first glass substrate and the CF substrate comprises a second glass substrate and a second polarization plate attached to the second glass substrate, the alignment films being respectively set on the surface of the first glass substrate away from the first polarization plate and the surface of the second glass substrate that is away from the second polarization plate.

Step 4: applying a sealant resin to the inside surface of the TFT substrate to which the flexible alignment film is attached to form an enclosing resin frame.

Step 5: providing liquid crystal and dropping the liquid crystal inside the enclosing resin frame on the inside surface of the TFT substrate, wherein the surface of the flexible alignment film that opposes the liquid crystal forms alignment structures, the alignment structures being formed through photoreaction or polymerization deposition in order to effect alignment of liquid crystal molecules. The direction of alignment of the alignment structures can be identical or alignment can be effected with specific shape, such as fish bone configuration.

Step 6: bonding the inside surface of the CF substrate to which the flexible alignment film is attached, in a parallel manner, to the inside surface of the TFT substrate so as to enclose the liquid crystal between the TFT substrate and the CF substrate.

In summary, the present invention provides a liquid crystal display device and a manufacturing method thereof, in which a flexible membrane like alignment film is used as an alignment layer to accomplish alignment of liquid crystal molecules thereby simplifying the manufacturing process, reducing the manufacturing cost, and improving manufacturing efficiency and being also helpful for precisely controlling size and marginal configuration of the alignment layer so as to enhance the quality of liquid crystal display device. Further, the alignment film is attached to the substrate by adhesives to further simplify the manufacturing process of a liquid crystal display and improve manufacturing efficiency.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising: a TFT (Thin-Film Transistor) substrate, a CF (Color Filter) substrate that is arranged opposite to and parallel with the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate, the TFT substrate and the CF substrate having inside surfaces that oppose the liquid crystal and are both provided with alignment layers, the alignment layers comprising flexible alignment films, which are in the form of thin membranes that are separate from the TFT substrate and the CF substrate, each of the flexible alignment films having a first surface opposing the liquid crystal and comprising an alignment structure formed thereon an opposite surface on which adhesive is coated, the flexible alignment films being attachable to the inside surfaces of the TFT substrate and the CF substrate with the adhesive so that the adhesive is sandwiched between the flexible alignment films and the TFT substrate and the CF substrate to fix the flexible alignment films to the inside surfaces of the TFT substrate and the CF substrate.

2. The liquid crystal display device as claimed in claim 1, wherein the flexible alignment films are formed through stretching, inkjet printing, printing, or polymerization deposition.

3. The liquid crystal display device as claimed in claim 1, wherein the alignment structures of the flexible alignment films are formed through photoreaction or polymerization deposition.

4. The liquid crystal display device as claimed in claim 3, wherein the alignment structures have identical direction of alignment.

5. The liquid crystal display device as claimed in claim 3, wherein the alignment structures are of a fish bone configuration.

* * * * *